United States Patent [19]

Cesar et al.

[11] Patent Number: 5,379,820

[45] Date of Patent: Jan. 10, 1995

[54] TIRE INTENDED FOR HEAVY LOADS AND TO BE INFLATED TO A HIGH PRESSURE

[75] Inventors: Jean-Pierre Cesar, Sayat; Antoine Massy, Chamalieres, both of France

[73] Assignee: Compagnie Generale des Etablissements Michelin - Michelin & Cie, Clermont-Ferrand Cedex, France

[21] Appl. No.: 81,255

[22] PCT Filed: Dec. 30, 1991

[86] PCT No.: PCT/FR91/01081

§ 371 Date: Jun. 24, 1993

§ 102(e) Date: Jun. 24, 1993

[87] PCT Pub. No.: WO92/12020

PCT Pub. Date: Jul. 23, 1992

[30] Foreign Application Priority Data

Jan. 14, 1991 [FR] France ............... 91 00403

[51] Int. Cl.⁶ ............................................. B60C 9/02
[52] U.S. Cl. ............................. 152/546; 152/550; 152/552; 152/554
[58] Field of Search ............... 152/539, 546, 548, 550, 152/552, 553, 555, 551, 554

[56] References Cited

U.S. PATENT DOCUMENTS

| | | | |
|---|---|---|---|
| 1,393,952 | 10/1921 | Miller | 152/550 |
| 3,386,486 | 6/1968 | Kovac et al. | 152/550 |
| 3,638,705 | 2/1972 | Devienne et al. | |
| 4,029,137 | 6/1977 | Suydam | |
| 4,177,852 | 12/1979 | Merli et al. | 152/552 |
| 4,244,414 | 1/1981 | Uemura et al. | |

FOREIGN PATENT DOCUMENTS

| | | | |
|---|---|---|---|
| 0320290 | 6/1989 | European Pat. Off. | 152/548 |
| 1427189 | 12/1965 | France | |
| 2507970 | 12/1982 | France | |
| 0179411 | 10/1984 | Japan | |
| 0199303 | 11/1984 | Japan | |
| 2104011 | 3/1983 | United Kingdom | 152/550 |
| 2218676 | 11/1989 | United Kingdom | |

OTHER PUBLICATIONS

Patent Abstracts of Japan, vol. 9, No. 67 (M–366) (1790) 27 Mar. 1985 (54) Pneumatic Tire (Sumitomo Gomu Kogyo K.K. Appln. No. 58-71953.

Primary Examiner—Michael W. Ball
Assistant Examiner—Nancy T. Krawczyk
Attorney, Agent, or Firm—Brumbaugh, Graves, Donohue & Raymond

[57] ABSTRACT

The present invention relates to a tire (P) intended to bear heavy loads and inflated to high pressure, particularly suited for use as an airplane tire. In order to improve the fatigue strength of the beads (4), the axially outer plies (3E, 3F) of the carcass reinforcement (3) in the region of the beads (4) have their edges (30E, 30F) disposed between the upturns (30A, 30B, 30C, 30D) of the axially inner plies (3A, 3B, 3C, 3D).

6 Claims, 1 Drawing Sheet

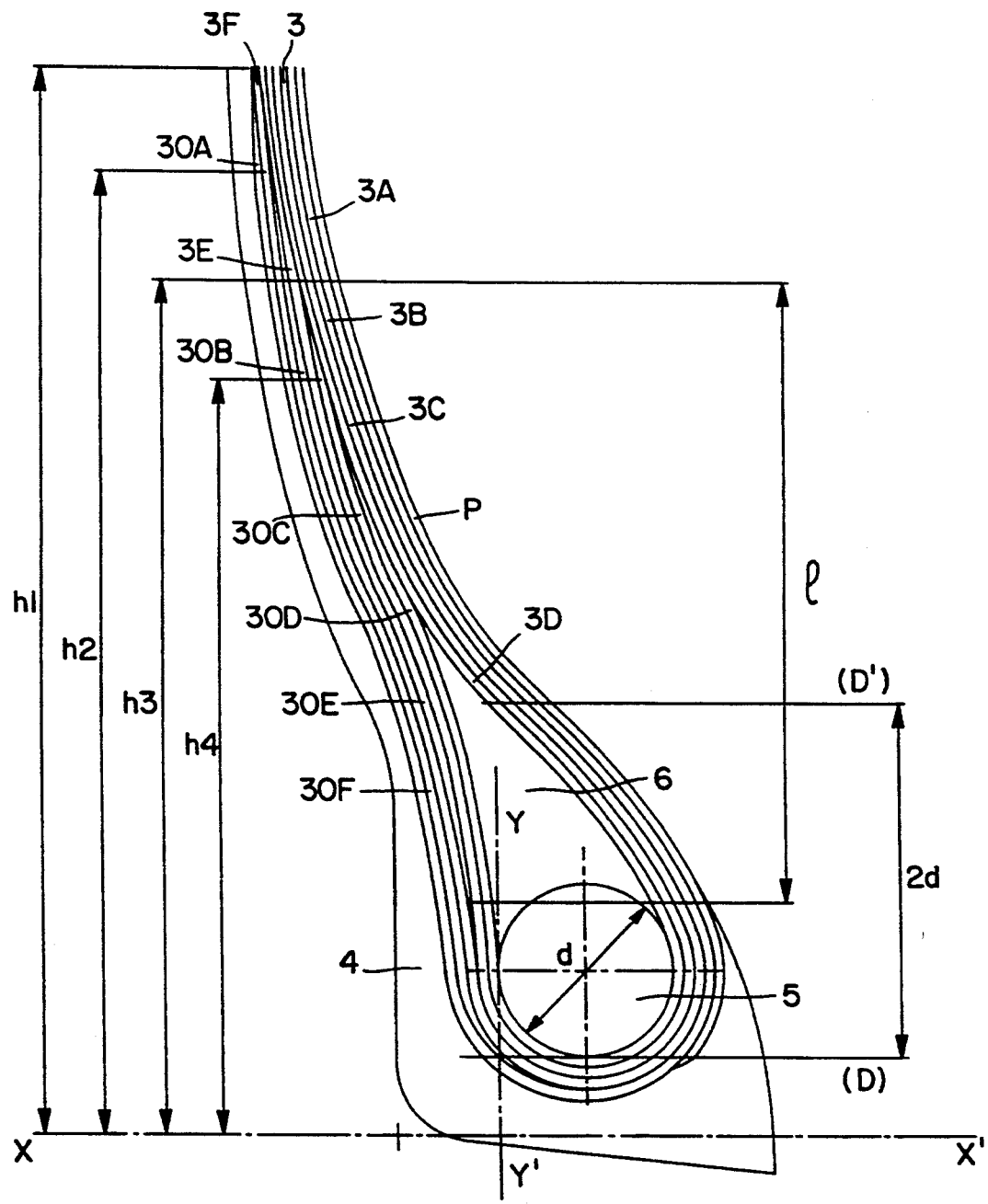

TIRE INTENDED FOR HEAVY LOADS AND TO BE INFLATED TO A HIGH PRESSURE

BACKGROUND OF THE INVENTION

The present invention relates to tires with radial carcass reinforcement intended to bear heavy loads and to be inflated to relatively high pressures, and particularly to tires suited for use as airplane tires.

The radial carcass reinforcements of such tires generally have several plies of textile cables which are anchored in each bead to at least one bead wire and generally to a single bead wire. The reinforcement elements of these tires are wound around said bead wire from the inside to the outside, forming upturns the ends of which are spaced radially from the axis of rotation of the tire. The severe conditions under which airplane tires are used, and, in particular, the overloads imposed, are such that the fatigue strength endurance of the beads is slight, particularly at the place of the ends of the upturns of the carcass reinforcement.

A substantial improvement in performance is obtained by separating the plies of the carcass reinforcement into two groups. The first group comprises the axially inner carcass reinforcement plies in the region of the beads, these plies being then wound around a bead wire in each bead from the inside to the outside of the tire. The second group is formed of at least one axially outer ply in the region of the beads, which ply is generally wound around the bead wire going from the outside to the inside of the tire.

Such arrangements are known and are shown, for instance, in U.S. Pat. No. 4,244,414 (FIG. 2).

The fatigue strength of the beads formed in this manner is, however, still insufficient and this lack of fatigue strength results in separations between the outer plies and/or the last outer ply and the rubber which covers it, this rubber forming the outside of the bead and/or of the side wall; these separations are generally accompanied by fatigue of the cables of these plies.

SUMMARY OF THE INVENTION

The present invention proposes a solution in order to improve the life of the beads of the tires concerned while using bead wires having inside diameters as small as possible, which permits better resting on the flanges of the rim, this solution comprising arranging the edge (edges) of the axially outer ply (plies) between the upturns of the axially inner plies, without winding around the bead wires.

The present invention relates to a tire, intended for heavy loads and to be inflated to high pressures, particularly suited for use as an airplane tire, having a tread, a crown reinforcement, and a radial carcass reinforcement comprising at least two axially inner plies of textile cords, wound around a bead wire in each bead from the inside to the outside of the tire and then forming upturns, and at least one axially outer ply of textile cords superimposed on the inner plies below the crown reinforcement and separating said plies in the beads in order to extend along the upturns in the beads, characterized by the fact that each of the outer plies has its edges arranged between the upturns of two adjacent inner plies and by the fact that the ends of the axially outer ply (plies) are disposed axially to the outside of a straight line perpendicular to the axis of rotation of the tire and tangent to the circle circumscribed on the bead wire, axially on the outer side thereto, while remaining situated radially to the outside of a straight line parallel to the axis of rotation, tangent to the circles circumscribed on the cross sections of the bead wires at their points radially closest to the axis of rotation.

In the case of a plurality of axially outer plies, a uniform distribution of the tensions on these plies is also obtained. For the same purpose, the ends of the upturns of the axially inner plies are preferably spaced from the base of the bead by a height at least equal to 0.25 times the height of the tire mounted on its service rim, inflated to its service pressure, said height being measured at the level of the center line of the radial carcass reinforcement.

In the same way, the said upturns have radially spaced ends, the difference between the radial distances of the ends of two adjacent upturns being at least equal to 0.03 times the height of the tire on the rim, the radial distances being all different from each other.

Furthermore, the common distance or radial distance of junction between an axially outer ply and the two axially inner plies which surround it that is to say, the radial overlap between the end of the outer ply and the closest end of an adjacent inner ply, is advantageously greater than 0.15 times the height on the rim of the tire.

The presence of sufficiently long upturns as well as the fact that their ends are spaced radially makes it possible also to obtain a certain advantage, namely to increase consequently the value of the test pressure which the airplane tire must withstand. If one recalls that the test pressure must be equal to four times the service pressure, it is then possible to increase the inflation pressure used for the tire in normal service or, which is preferable, to lighten the tire while retaining the constant service and test pressures.

The life of the beads is further improved if the longest upturn is that of the first axially inner ply and the shortest upturn that of the last axially inner ply, all the upturns being spaced by the same radial distance.

Preferably, the ends of the axially outer ply or plies are disposed on the inside of a second straight line parallel to the axis of rotation and spaced radially from the first straight line tangent to the circles circumscribed on the cross sections of the bead wires at their points radially closest to the axis of rotation by an amount equal to twice the diameter of the circles circumscribed on the bead-wire cross sections.

DESCRIPTION OF DRAWING

The invention will be better understood by means of the following description, read with reference to the diagrammatic drawing, which is given by way of example. In this drawing, FIG. 1 is a sectional view of a bead of a tire in accordance with the invention.

DESCRIPTION OF PREFERRED EMBODIMENTS

The example given is that of an airplane tire of size 46×17.0 R 20, mounted on a standard rim of size 13.25×20 (standards of the Tire and Rim Association). The carcass reinforcement 3 is formed of six carcass plies 3A to 3F of textile cords.

Among these six plies, four axially inner plies 3A to 3D are wound in each bead 4 around a bead wire 5 of circular cross section from the inside to the outside of the tire P, forming upturns 30A to 30D. The ends of these upturns are spaced from the base of the bead, represented by a line XX' parallel to the axis of rotation of the tire and passing through the point of intersection of the vertical wall of the bead and the frustoconical generatrix of its seat by the respective heights $h_1$, $h_2$, $h_3$, $h_4$. The greatest height $h_1$ is the height of the upturn 30A of the first axially inner ply 3A, while the smallest height $h_4$ is the height of the upturn 30D of the last axially inner ply 3D, the intermediate heights $h_2$ and $h_3$ being those of the upturns 30B and 30C of the intermediate plies 3B and 3C. These heights $h_1$ to $h_4$ are equal to 33%, 38%, 43% and 48%, respectively, of the height H of the tire on the rim, equal to 290 mm.

By definition, the height (not shown) of the tire, mounted and inflated, is the radial distance measured between a line parallel to the axis of rotation passing through the top point of the center line of the carcass reinforcement and a line parallel to the axis of rotation, spaced from said axis by an amount equal to the standard nominal radius of the service rim.

The axially outer carcass plies 3E and 3F have their edges 30E and 30F, which are disposed between the upturns 30C and 30B, respectively, of the inner plies 3C and 3B and the upturns 30C and 30D of the plies 3C and 3D. The ends of these plies 3E and 3F are located, seen in meridian section, axially to the outside of the line YY' perpendicular to the axis of rotation of the tire, and therefore to XX' and tangent to the circle circumscribed on the bead wire 5 at its point axially furthest towards the outside. They are located radially at the level of the bead wire 5 between the straight line D parallel to the axis of rotation of the tire and tangent to the base of the circle circumscribed around the bead wire 5 and the straight line D' parallel to D and spaced radially from D by the amount 2d, d being the diameter of the bead wire 5.

As compared with a tire of the same size having a carcass reinforcement with the same number of axially inner plies and the same number of axially outer plies, but the outer plies of which cover the upturns of the inner plies, as shown, for instance, in FIG. 2 of U.S. Pat. No. 4,244,414 mentioned above, the tire of the present invention, under conditions of equal load of 19,600 kg and an inflation pressure of 14.8 bar completed 3,000 cycles, namely about 30% more than the control tire, which completed 2300 cycles, the travel being effected on a flywheel and a cycle reproducing a phase of travel under load followed by a phase with elimination of the load.

Furthermore, the tire of the invention has a bursting pressure which is 15% greater than the bursting pressure of the control tire and far greater than the normal test pressure for the size in question.

We claim:

1. A tire, intended for heavy loads and to be inflated to a high pressure, having a tread, beads containing bead wires, a crown reinforcement and a radial carcass reinforcement comprising at least two axially inner plies of textile cords, wound around a bead wire in each bead from the inside to the outside of the tire and then forming upturns, and at least one axially outer ply of textile cords superimposed on the inner plies below the crown reinforcement and separating said plies in the beads in order to extend along the upturns in the beads, characterized by the fact that each of the outer plies is disposed between the upturns of two adjacent axially inner plies, and by the fact that the ends of the outerplies are disposed axially to the outside of a straight line (YY') perpendicular to the axis of rotation of the tire and tangent to the circle circumscribed on the bead wire at its point axially furthest to the outside, and radially to the outside of a straight line (D) parallel to the axis of rotation of the tire and tangent to the circles circumscribed on the bead wires at their points closest to the axis of rotation.

2. A tire according to claim 1, characterized by the fact that the ends of the upturns of the inner plies are spaced from the base of the beads by a height at least equal to 0.25 times the height H of the tire on its rim, measured at the level of the center line of the carcass reinforcement.

3. A tire according to claim 2, characterized by the fact that radial distances $h_1$, $h_2$, $h_3$, $h_4$ separating the ends of the upturns from the base of the beads are different from each other, the difference between two of these distances being at least equal to 0.03 times the height H of the tire on the rim.

4. A tire according to claim 1, characterized by the fact that the common radial distance between an axially outer ply and the two axially inner plies which surround it is at least equal to 0.15 times the height H of the tire on the rim.

5. A tire according to claim 2, characterized by the fact that the first axially inner ply has upturns the ends of which are separated from the base of the beads by a height $h_1$ which is the largest, equal to 0.5 H, the second axially inner ply has upturns the ends of which are separated from the base of the beads by a height $h_4$ which is the smallest and is equal to 0.25 H, $h_2$ and $h_3$ being the relative distances to the ends of the upturns of intermediate plies such that $h_1 > h_2 > h_3 > h_4$.

6. A tire according to claim 1, characterized by the fact that the ends of the edges of the outer plies are disposed radially to the inside of a straight line (D') parallel to the straight line (D) which is tangent to the innermost point of the circle circumscribed on the bead wire and spaced radially from said tangential straight line by an amount equal to 2d, d being the diameter of the circle circumscribed on the cross section of a bead wire.

* * * * *